United States Patent [19]

Forge

[11] Patent Number: 4,959,606
[45] Date of Patent: Sep. 25, 1990

[54] CURRENT MODE SWITCHING REGULATOR WITH PROGRAMMED OFFTIME

[75] Inventor: Charles O. Forge, Los Altos, Calif.

[73] Assignee: Uniphase Corporation, San Jose, Calif.

[21] Appl. No.: 294,157

[22] Filed: Jan. 6, 1989

[51] Int. Cl.⁵ .......................................... H02M 3/156
[52] U.S. Cl. ................... 323/286; 323/288; 323/290
[58] Field of Search ............... 323/222, 284–288, 323/290, 268, 272, 299

[56] References Cited

U.S. PATENT DOCUMENTS

| | | | |
|---|---|---|---|
| 3,323,034 | 5/1967 | Dubin et al. | 363/86 |
| 3,564,388 | 2/1971 | Nolf | 363/86 |
| 4,013,939 | 3/1977 | Biess et al. | 323/286 |
| 4,536,700 | 8/1985 | Bello et al. | 323/285 |
| 4,553,082 | 11/1985 | Nesler | 323/288 |
| 4,616,301 | 10/1986 | Small | 363/26 |
| 4,709,322 | 11/1987 | Mirow | 323/285 |
| 4,717,994 | 1/1988 | Diaz et al. | 323/299 |

FOREIGN PATENT DOCUMENTS 970338  10/1982  U.S.S.R. ............................... 323/285

OTHER PUBLICATIONS

Holland, "A New Integrated Circuit for Current Mode Control," Powercon 10, 1983.
"Linear Integrated Circuits Current Mode PWM Controller," Unitrode, Feb. 1983.
Calvo et al, "Circuit to Linearize the Control Loop of a Switching Voltage Regulator", IBM Tech. Discl. Bul., vol. 22, No. 6, pp. 2191, 2192, Nov. 1979.

Primary Examiner—William H. Beha, Jr.
Attorney, Agent, or Firm—Skjerven, Morrill, MacPherson, Franklin & Friel

[57] ABSTRACT

A current mode switching regulator power supply with an improved regulator system achieves a constant operating period by predetermining the off time of the switching transistor. The off time is programmed by the input and output voltages acting on a resistor-capacitor timing circuit enabled by a current mode controller.

13 Claims, 7 Drawing Sheets

CURRENT MODE SWITCHING REGULATOR WITH PROGRAMMED OFFTIME

BACKGROUND OF THE INVENTION

1. Field of the Invention

This invention relates to power supplies and in particular to a constant frequency current mode switching regulator power supply with an improved regulator system which eliminates oscillations in the widths of the pulses from the power switch in the power supply without the use of any extra feedback loops.

2. Description of the Prior Art

Most control systems for switching power supplies utilize a single control loop that compares the DC output voltage (or current) from the power supply to a fixed reference voltage. Any difference or "error" between the two voltages is amplified and used to directly control the pulse width (i.e., "on time") of the power switch in the power supply in a negative feedback arrangement. This produces a regulated (fixed) output voltage or current. This control method has the following disadvantages:

1. Slow loop response to load transients;
2. Slow loop response to input voltage changes;
3. Allows certain imbalances in push-pull power switch circuits used in the power supply to cause power switch failure due to excessive current caused by transformer saturation.

FIG. 1 illustrates a typical prior art power supply of this type which is sometimes called a "buck" regulator. In the structure of FIG. 1, the output voltage on lead 12 from the power supply (often called a "converter") is sent to error amplifier 15 on the inverting input lead 17a of error amplifier 15. A signal proportional to the output current is sent to error amplifier 15 in the case of a constant current power supply. Voltage reference 18 is applied to the noninverting input lead 17b of error amplifier 15. The output signal on lead 16 from error amplifier 15 reflects the difference between the voltage on output lead 12 and the reference voltage 18 and controls both the duty cycle and width of the pulses produced by pulse width modulator 13 which modulates the input voltage 11. Choke 14 operates in conjunction with capacitor 19 to smooth and average the output pulses from modulator 13.

Improvements over single control loop supplies of the type shown in FIG. 1 have previously been made by adding a second current source loop inside the main voltage loop. FIG. 2 illustrates a typical prior art circuit of this type. The circuit of FIG. 2 includes error amplifier 26 and current sensor 27 as a second loop 30 inside the main voltage loop described above in conjunction with FIG. 1. The error voltage from error amplifier 25 (corresponding to error amplifier 15 in FIG. 1) controls the current source loop 30 which in turn controls the peak switch current from power switch 23 on a cycle by cycle basis. The system including the second loop 30 exhibits much faster response to input and output voltage changes and output current changes, than does the system of FIG. 1. When the power switch 23 is configured as a push-pull circuit, loop 30 corrects for transformer imbalances such as differences in switch transistor storage times, and for noise and load transients which can cause transformer flux saturation and thus excessive DC current in the switching transistors.

Although the addition of the second current source loop 30 as shown in FIG. 2 improves response speed and balance of the power supply, it adds instability to the pulse widths of the pulses from power switch 23 at greater than 50% switch duty cycles. The duty cycle is the ratio of the on-time of power switch 23 to the total period of the pulses from switch 23. This instability appears as subharmonic oscillations of the pulse widths at a frequency lower than the switching frequency. These oscillations alternately narrow and widen the widths of the pulses from power switch 23. This instability may be stopped by the addition of an artificial ramp to the "switch current sense" waveforms generated by switch current sense circuit 27. This ramp is difficult to generate because it ideally should change magnitude with output load if optimum performance of the power supply over a wide load range is required. The oscillation, which occurs at a submultiple of the switching frequency, is a predictable result of using "clocked-on" controllers (i.e., turning on power switch 23 regularly at a fixed frequency), turning off power switch 23 when the current from switch 23 reaches a predetermined level, with duty cycles greater than fifty percent (50%).

Additional prior art is disclosed in Small, U.S. Pat. No. 4,616,301, issued Oct. 7, 1986. Small discloses a power supply which eliminates the potential for oscillation by not utilizing a "clocked-on" controller, but rather a semi-fixed off time controller. This is accomplished utilizing an industry standard part number TL494 control integrated circuit.

In accordance with Small's device, a third loop is added to the structure of FIG. 2 to hold substantially constant over the long term but to allow to vary over the short term the frequency of the power switch 23 (which produces a pulse width modulated output signal from a DC input signal) by controlling "off-time".

Thus the prior art of Small detects average frequency and changes the off time until the frequency is correct, by using a feedback loop. Small's circuit has at least one disadvantage in that it is very complex due to the frequency control circuit having an active feedback loop. Switching power supply regulators operate in a high electrical noise environment due to the switching action of the power switch transistors. A complex regulator having large wiring loops has the major disadvantage that the wiring loops pick up the electrical noise and hence such a regulator may not operate as effectively as is desirable.

SUMMARY OF THE INVENTION

This invention provides a simplified power regulator by not including feedback loops, and also eliminates the potential for oscillation by not utilizing a clock controller.

In accordance with the invention, a circuit capable of a 90% or greater duty factor is provided that predicts the off time necessary to make the entire cycle time (off time plus on time) the desired length. The steady-state off time (i.e., $t_{off}$) is, in accordance with the invention, programmably a function of the input voltage E and output voltage $e_o$ and cycle time $t_{period}$, according to the relationship $$t_{off} = [(E - e_o)/E] * t_{period}.$$

Thus in accordance with the present invention a means to time voltage pulses by means of a preprogrammed off time is provided, rather than the prior art frequency correction scheme. The present invention is applicable to both constant current and constant voltage power supplies. In accordance with the present invention, the voltage pulse frequency is varied in a predetermined manner or is held constant.

This invention will be more fully understood in accordance with the following detailed description taken together with the drawings.

DETAILED DESCRIPTION OF THE INVENTION

For simplicity, identical reference numbers in the various figures denote similar structures.

Figure 3:
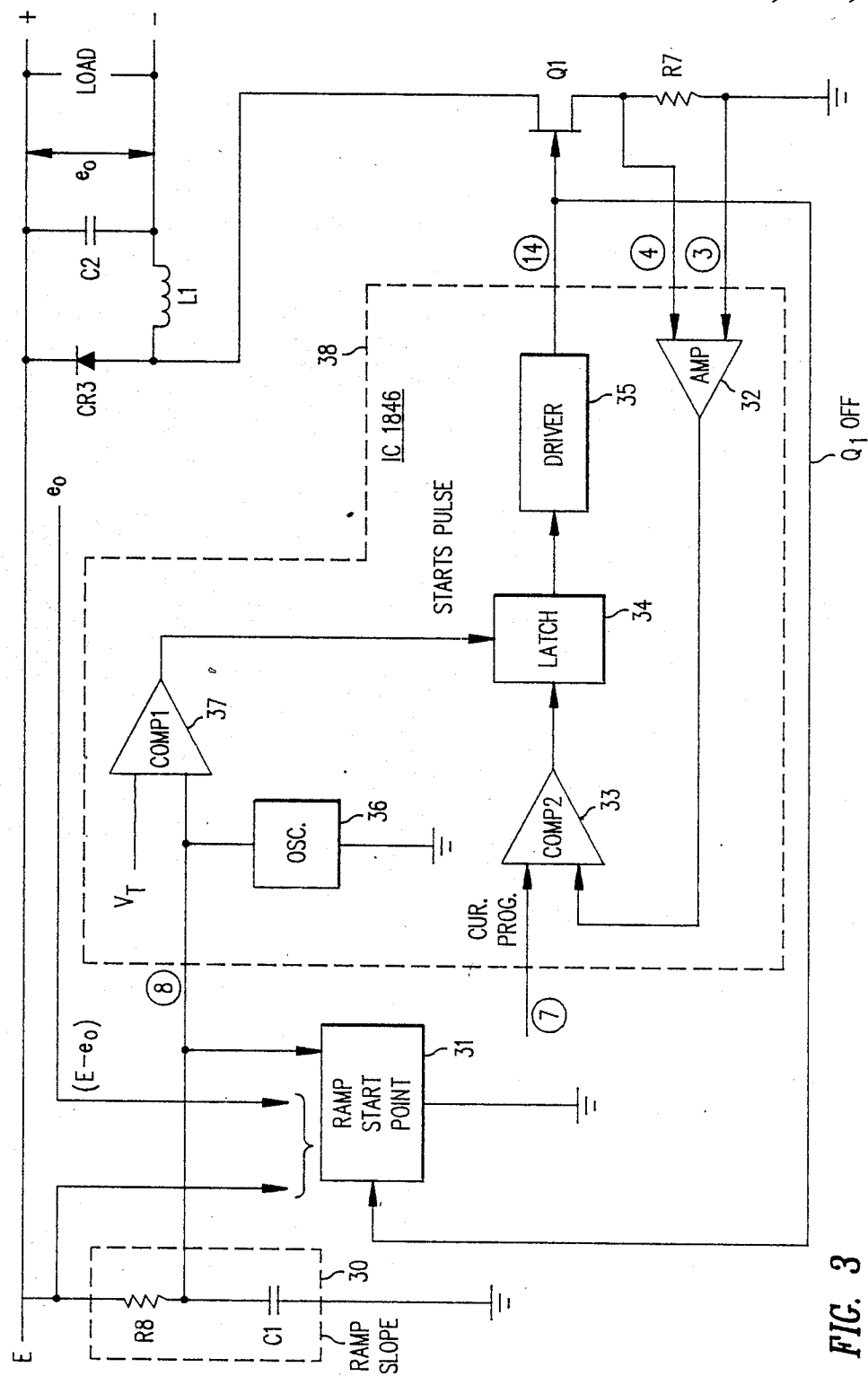
FIG. 3 shows a block diagram of the preferred embodiment of the present invention.

FIG. 3 shows a simplified block diagram of the preferred embodiment of the present invention. In the following description, the particular value of each component in the preferred embodiment is listed after the component is identified. Other embodiments of the invention may, of course, use different component values.

Input voltage E is provided conventionally from a rectifier (not shown) to a conventional buck regulator circuit including catch diode CR3 (a high frequency power "freewheeling" diode), 10 $\mu$F capacitor C2, inductor L1 (500 $\mu$H, about 55 turns), and field effect transistor (FET) power switch Q1, which provides output voltage $e_o$ to the Load. Power switch Q1 is one FET transistor or alternatively several FET transistors conventionally connected in parallel.

The typical input voltage E for the preferred embodiment of the present invention is about 320 volts DC; the output voltage $e_o$ is about 200 volts DC, but a wide range of input voltages and output voltages is possible consistent with the invention. (E is always greater than $e_o$ for a buck regulator.) Input voltage E is also applied to the Ramp Slope circuit 30 including preferably resistor R8 (preferably 2 M.ohms) and capacitor C1 (preferably 820 pico Farad), and to the Ramp Starting Point circuit 31. The Ramp Slope circuit 30 and the Ramp Starting Point circuit 31 (described in detail below) together determine the off time period of switch transistor Q1 as described above. The voltage E-$e_o$ is also provided to the Ramp Starting Point circuit 31 as shown.

Current control circuit 38 (typically IC 1846 and preferably a commercially available Unitrode UC 1846) turns switch transistor Q1 on and off at pin 14 in response to signals from the Ramp Slope circuit 30 and the Ramp Starting Point circuit 31. (The pin numbers of IC 1846 are shown circled in FIG. 3.) The lower control loop of current control circuit IC 1846 (including the amplifier AMP 32 and second comparator COMP2 33) turns off switch transistor Q1 when the current output by switch transistor Q1 exceeds an externally provided (at pin 7) programmed current level CUR.-PROG. This current level is sensed in sense resistor R7 and input to IC 1846 at pins 3 and 4 and amplified in the amplifier AMP 32 (preferably amplifying the signal by a factor of three), and measured by voltage comparator COMP2 33 in IC 1846. Comparator COMP2 33 then activates the Latch 34 to drive switch transistor Q1 off by means of the Driver circuit 35.

The upper control loop (including the oscillator OSC 36 and first comparator COMP1 37) of control circuit IC 1846 includes a voltage comparator COMP1 37 which determines the off time of switch transistor Q1 by comparing the voltage $V_{C1}$ across capacitor C1 to threshold voltage $V_T$ supplied by IC 1846; when the voltage across capacitor C1 exceeds $V_T$, comparator COMP1 37 sends a start pulse to the Latch 34 which turns on switch transistor Q1 by means of the Driver circuit 35.

When switch transistor Q1 first is switched off, a timing signal "Q1 OFF" is sent back to the Ramp Starting Point circuit 31 to initiate the charging of capacitor C1.

Figure 1:
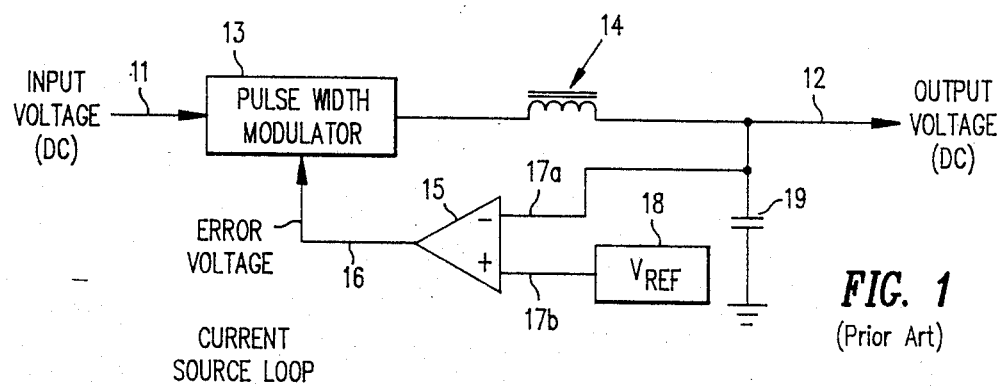
FIG. 1 shows a prior art power supply.
Figure 2:
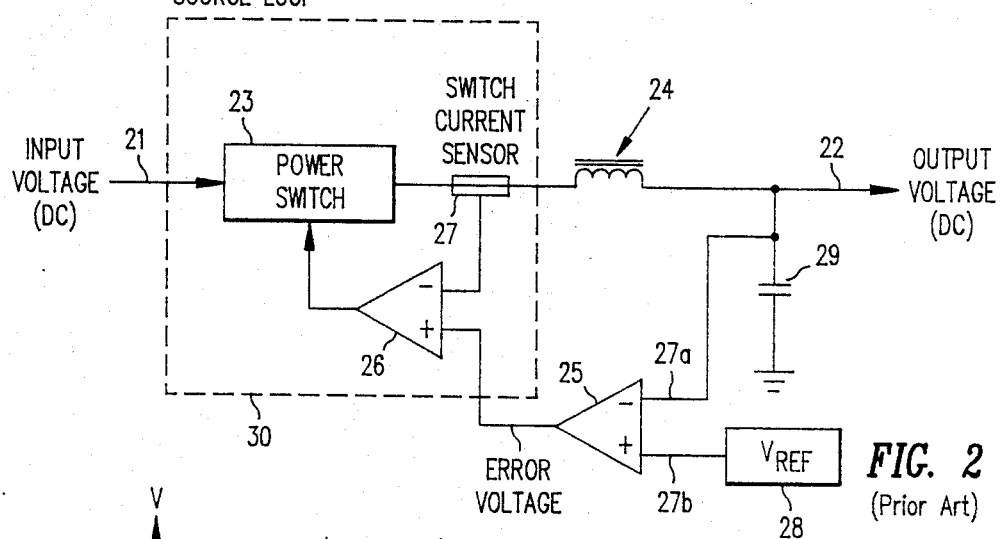
FIG. 2 shows a second prior art power supply.
Figure 4A:
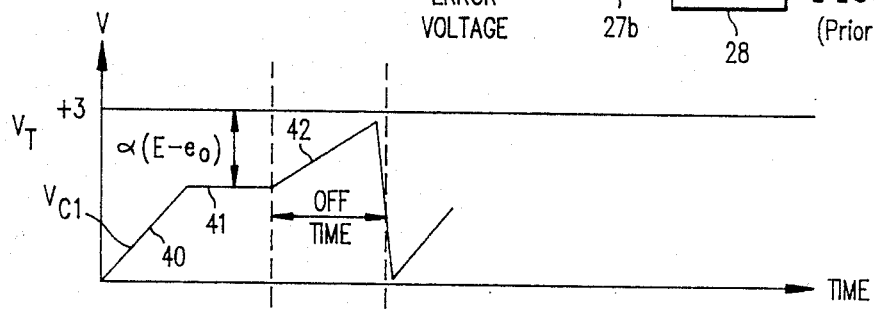
FIGS. 4A, 4B, 4C, 4D, 4E, and 4F show waveforms in accordance with the present invention.
Figure 4B:
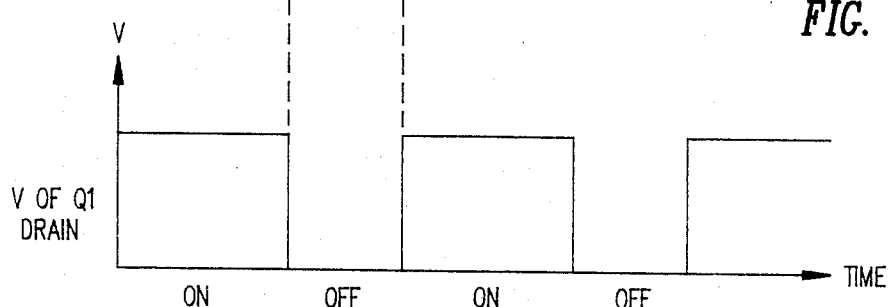

The waveforms produced by the above described circuit are shown in FIGS. 4A and 4B. FIG. 4A shows time on the horizontal axis and voltage $V_{C1}$ (i.e., the voltage across capacitor C1) on the vertical axis. As seen, initially with switching transistor Q1 on (i.e., a low voltage at the drain "D" of transistor Q1) as shown in FIG. 4B, capacitor C1 charges at 40 as shown in FIG. 4A and so voltage $V_{C1}$ increases up towards the threshold voltage $V_T$, which is preferably about 3 volts. Before $V_{C1}$ can reach $V_T$, however, a second transistor Q2 (not shown in FIG. 3 but described further below) in the Ramp Starting Point Circuit 31 in FIG. 3 sets the off time ramp starting point voltage 41 well below $V_T$. The starting point voltage 41 is below $V_T$ by a value proportional to the value (E-$e_o$) and so is shown in FIG. 4A as being below $V_T$ by $\alpha$ (E-$e_o$). At the ramp starting point voltage 41 (the horizontal part of the waveform as shown in FIG. 4A) transistor Q1 is switched off by IC 1846. From the ramp starting point 41, during the transistor Q1 offtime, voltage $V_{C1}$ then ramps up. The slope of the ramp 42 from the starting point 41 up to $V_T$ is equal to $$\frac{dV_{C1}}{dt} = \text{current}/C_1 = (E/R8)/C1 = E/(R8^*C1).$$

Thus the values of E and $e_o$ determine the starting point voltage 41 (which is below $V_T$ by an amount proportional to E-$e_o$ as discussed above) for the $V_{C1}$ off time timing ramp 42, and the values of E, R8, and C1 determine the slope of the off time timing ramp 42.

The off time for switch transistor Q1 lasts (as seen in FIG. 4A) for the duration of time needed for voltage $V_{C1}$ to go from the ramp starting point 41 up to $V_T$. When voltage $V_{C1}$ is charged up to $V_T$ (which is preferably 3 volts), the internal comparator COMP1 37 in IC 1846 (see FIG. 3) detects this voltage level at pin 8 and IC 1846 turns on switch transistor Q1 by a pulse at pin 14, thus ending the off time of transistor Q1, as shown in FIG. 4B. For simplicity, only one cycle is shown in FIG. 4A.

Figure 4C:
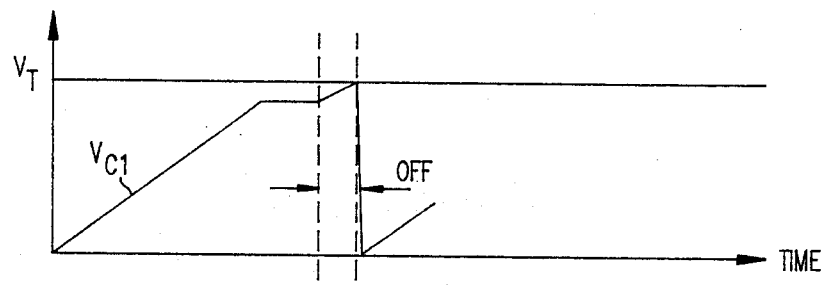
Figure 4D:
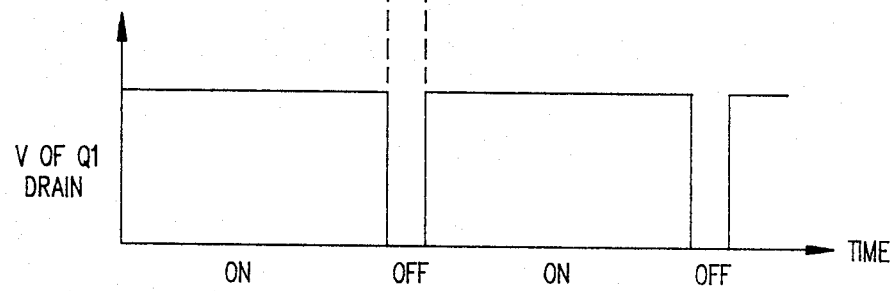

FIG. 4C shows the case where the output voltage is nearly as large as the input voltage, resulting in a short off time. The off time ramp slope is the same as in FIG. 4A, the input voltage is the same as in FIG. 4A, and the output voltage is larger than in FIG. 4A, with the total cycle time (on TIME plus off time) the same as in FIG. 4A. FIG. 4D thus shows the on/off time for FIG. 4C; note the higher duty factor than in FIG. 4B.

Figure 4E:
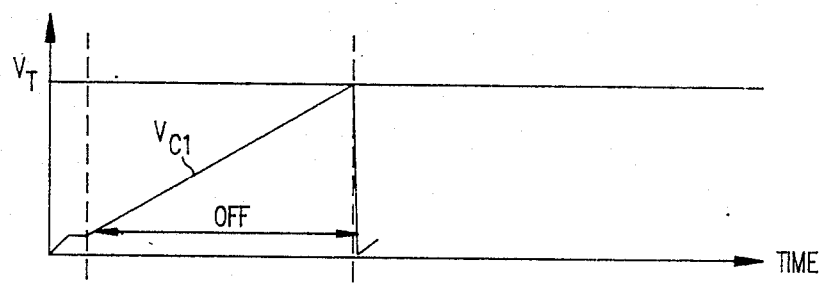
Figure 4F:
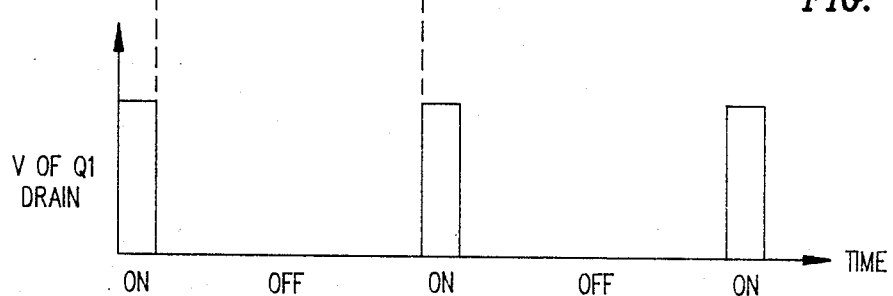

FIG. 4E shows the case of an input voltage the same as in FIG. 4A, but with a much lower output voltage, resulting (as shown in FIG. 4F) in a very short on time. Again, the total cycle time is the same as in FIG. 4A.

The circuit shown in block diagram form in FIG. 3 is shown in greater detail in FIG. 5 and operates in further detail as follows. Resistor R7 as described above is a conventional current sense resistor, whose voltage is used by the integrated circuit IC 1846 to determine beginning of the off time of power switch transistor Q1, in the usual manner for a current mode regulator. Resistor R8 and capacitor C1 are the Ramp Slope circuit 30 of FIG. 3 for the off time timing of switch transistor Q1, where an internal comparator COMP1 37 in the oscillator-comparator circuit OSC-COMP 50 of the IC 1846 detects when the ramp voltage $V_{C1}$ on capacitor C1 crosses threshold voltage $V_T$ (preferably about +3 volts) and turns transistor Q1 back on. Oscillator-comparator circuit 50 includes oscillator 36 and comparator COMP1 37 of FIG. 3. The voltage on capacitor C1 is pulled down (i.e., capacitor C1 is discharged) to approximately +1.2 volts by an internal discharge transistor Q4 in I.C. 1846, each time voltage $V_{C1}$ exceeds $V_T$ as sensed by comparator COMP1 37. Transistor Q2 acts to set the voltage $V_{C1}$ on capacitor C1 to the desired ramp starting point as described above while transistor Q1 is on, to achieve the designed off time while transistor Q1 is off and voltage $V_{C1}$ ramps up to $V_T$. Transistor Q2's base-emitter junction is back biased (as discussed below) during the offtime of transistor Q1, so the timing ramp is purely under the control of resistor R8 and capacitor C1. The components R1, R2, R3, R4, CR1, L2, Q2, and Q3 preferably are the elements of Ramp Starting Point circuit 31 as shown in FIG. 3.

Transistor Q3 is turned on by a voltage applied to its base B on line 51 from resistor R6 when switch transistor Q1 is on. When transistor Q1 is first turned off, the same absence of a signal on pin 14 of I.C. 1846 that turns off transistor Q1 also turns off transistor Q3 and therefore is a timing signal to initiate the off time period. Thus, transistor Q3 has two functions. Transistor Q3 is on (i.e., its collector C is at about 1 volt) while the switch transistor Q1 is on. First, through resistor R3 and diode CR1, transistor Q3 when on pulls down slightly the voltage on transistor Q2's base B, so, in the case of 100% on-time, (i.e., a 100% duty cycle) capacitor C1 voltage $V_{C1}$ cannot exceed $V_T$ during Q1 on time and initiate a cycle in the IC 1846. With transistor Q3 off, especially at startup (i.e., when input voltage E is first applied to the regulator), voltage $V_{C1}$ must be able to exceed $V_T$ to initiate the first cycle. Inductor L1 voltage is zero at the startup time also.

Secondly, through resistor R2, transistor Q3 pulls current at pin 9 (as shown circled) from the conventional current mirror 52 which is part of the oscillator-comparator circuit 50 of IC 1846, and this current causes capacitor C1 to charge up (i.e., $V_{C1}$ increases) solidly against the clamping point of transistor Q2 during the interval that transistor Q3 is on. That is to say, when transistor Q3 is on it pulls current from the left hand lead (pin 9) of the current mirror 52. The current mirror 52 in response sends current out of its right hand lead (pin 8), and this current flows to capacitor C1 and charges capacitor C1. This charging sets the starting point for the offtime timing ramp as discussed above.

Transistor Q3 thus turns the current mirror 52 on and off. The current mirror 52 as described above is used to charge capacitor C1 up to the point where conventionally the emitter follower circuit including transistor Q2 clamps the voltage on capacitor C1 during Q1 on time; at Q1 turnoff, the current mirror 52 is turned off by transistor Q3 so the current mirror 52 is not providing current during the off time period of transistor Q1.

IC 1846 is preferably the commercially available Unitrode current mode PWM controller, part number UC1846. This controller is a typical pulse width modulated (PWM) device for use in switching power supplies. In conventional use, IC 1846 is the chief building block, along with several external components and a conventional "buck" regulator circuit, for a PWM switching power supply. The IC 1846 includes a number of functions including several comparators, logic gates, a current mirror, an oscillator, and bipolar transistors. In the preferred embodiment of the present invention, the IC 1846 is not used in the conventional manner, but instead several of its functions are used as described herein. Therefore similar functions as provided by IC 1846 could be provided by other integrated circuit or discrete devices in other embodiments of the present invention.

As described above, in both the prior art buck regulator and in the present invention, an inductor L1 (see FIG. 5) (or "choke" as it is sometimes referred to) smooths out and averages the voltage pulses. Thus when switch transistor Q1 is on, the voltage that is equal to the value of $E-e_o$ is applied across inductor L1. In the preferred embodiment of the present invention, a second inductor $L_2$ is also provided and is connected by means of resistor R5 between the base B of transistor Q2 and ground. Inductor $L_2$ preferably is a secondary winding on inductor L1, and preferably has only one turn.

Figure 5:
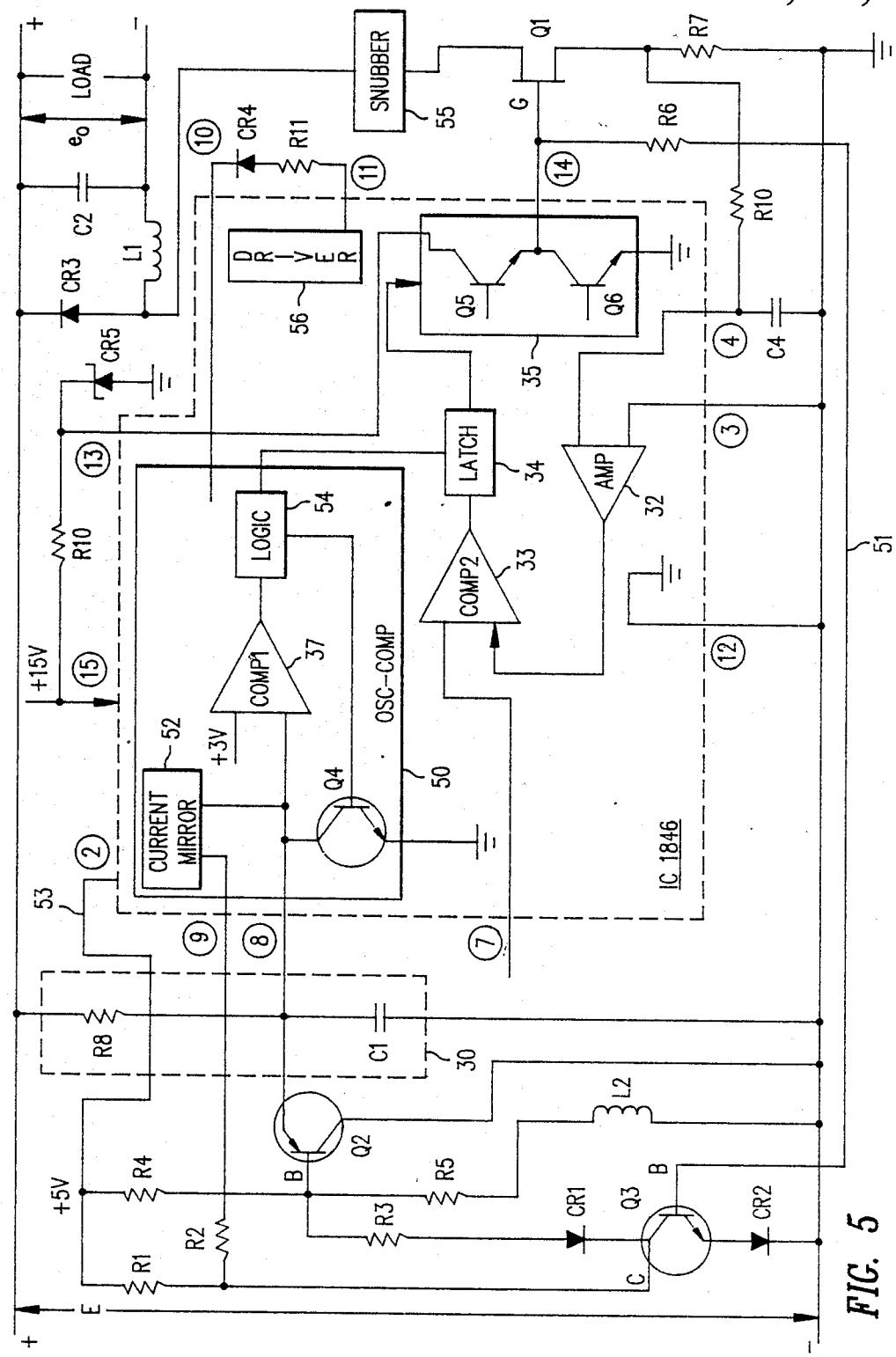
FIG. 5 shows a schematic diagram of the preferred embodiment of the present invention.

Also shown in the schematic of FIG. 5 are bias resistors R3, R4, and R5 which are respectively 680 ohms, 820 ohms, and 1000 ohms in the preferred embodiment. These resistors bias transistor Q2 as follows. Inductor L2, as stated above, is preferably a secondary one turn winding on inductor L1 which preferably has 55 turns. A change in the current flowing through L1 thus conventionally induces a voltage in inductor L2. The bias resistors R3, R4, R5, together with the +5 volts DC provided to resistor R4 from IC 1846 at pin 2, when switch transistor Q1 is on or off, add a positive voltage to the end of L2 which is connected to and closest to resistor R5.

Thus inductor L2, while switch transistor Q1 is on, makes a positive voltage on the base B of transistor Q2 less positive than it would be otherwise. Thus, while switch transistor Q1 is on, inductor L2 sets the voltage $V_{C1}$ that capacitor C1 can charge up to while transistor Q1 is on. That voltage, as described above, is below voltage $V_T$ by a value proportional to the input voltage E minus the output voltage $e_o$, because while transistor Q1 is on, the input voltage E minus the output voltage $e_o$ appears across inductor L1. Thus a voltage 1/55 (the ratio of the number of turns in $L_1$ to $L_2$) of voltage $(E-e_o)$ appears across inductor L2.

When switch transistor Q1 turns off, the end of inductor L2 which is directly connected to resistor R5 goes to a positive voltage and that starts the off time timing ramp, by back biasing the base-emitter junction of transistor Q2. Inductor L2 thus sets the starting point voltage of the timing ramp and releases capacitor C1 to start charging (i.e. to go up the off time timing ramp) as shown in FIG. 4A.

Resistor R1 (preferably 1000 ohms) as shown in FIG. 5 is a pullup resistor for the collector of transistor Q3 which ensures that the collector C of transistor Q3 goes to 5 volts, which is sufficient voltage to turn off the current mirror 52. Resistor R2 (preferably 18K ohms) charges capacitor C1 until capacitor C1 reaches the ramp starting point voltage during the on time of switch transistor Q1.

Diode CR1 completely disconnects the current mirror 52 from resistor R3 when transistor Q3 is off and so allows the collector C of transistor Q3 to go up to 5 volts. Diode CR2 puts a back bias on the base-emitter junction of transistor Q3 to ensure that the signal on the line 51 from resistor R6 fully turns off transistor Q3.

Also shown in FIG. 5 is a +5 volt DC power line 53 connected to resistor R4; power line 53 is provided by IC 1846 at pin 2. IC 1846 also receives +15 volts DC on power line input pin 15 in IC 1846 so as to provide (by means of Zener diode CR5 and resistor R10, preferably 180 ohms), 11 volts DC input for IC 1846 on pin 13. IC 1846 includes a conventional totem pole driver 35 (discussed above) including conventionally two bipolar transistors Q5 and Q6 that alternately connects pin 14 (which drives the gate G of switch transistor Q1) to ground and to pin 13 (the 11 volts input terminal). Totem pole driver 35 thus drives the gate G of switch transistor Q1 on and off.

Also shown in logic circuit 54 conventionally connected between the first comparator COMP1 37 and latch 34, so as to enable latch 34 which in turn controls totem pole driver 35.

Sense resistor R7 (preferably 0.07 ohms) is conventionally connected by means of resistor R10 (preferably 200 ohms) and capacitor C4 (preferably 5600 pF), which together are a conventional RC filter, to IC 1846 at pin 4, and the other end of resistor R7 is connected directly to pin 3 of IC 1846. Thus pins 3 and 4 provide the sensed current to IC 1846, to indicate to IC 1846 when the current flowing through switch Q1 reaches the programmed current level.

In the preferred embodiment, IC 1846 is therefore connected to the other circuit components as follows:

| Pin No. | IC 1846 (Unitrode 1846) | |
|---|---|---|
| | Pin Function | Connected To |
| 1 | | |
| 2 | +5 V power out | Resistor R4 |
| 3 | current sense input | Resistor R7 |
| 4 | current sense input | Capacitor C4 |
| 5 | | |
| 6 | | |
| 7 | current programming | external |
| 8 | current mirror source | collector of transistor Q3 |
| 9 | current mirror input | resistor R2 |
| 10 | defeat synch | pin 11 |
| 11 | feedback to pin 10 | pin 10 |
| 12 | ground | ground |
| 13 | +11 V input | pin 15 by resistor R10 |
| 14 | drives switch Q1 | transistor Q1 gate and R6 |
| 15 | +15 V power in | pin 13 by resistor R10 |

Also shown in FIG. 5 is conventional snubber circuit 55 (shown in block form only) for the purpose of suppressing transient current surges at transistor Q1 turn on. Snubber circuit 55 is conventionally connected between switch transistor Q1 and catch diode CR3.

Pin 11 of IC 1846 is connected as shown to pin 10 of IC 1846 by means of diode CR4 and resistor R11 (preferably 1000 ohms). The purpose of this connection is to feedback the output of pin 11 from driver circuit 56 to synchronization input pin 10 which connects to the oscillator-comparator 50 in IC 1846. This pin 10 to pin 11 connection thus defeats the conventional operation of the IC 1846 and so forces IC 1846 to start a new cycle on pin 14 as soon as the previous cycle is complete. This permits the regulator of the present invention to perform (i.e., keep output active) at a duty cycle of over 50%.

Figures 6, 6A:
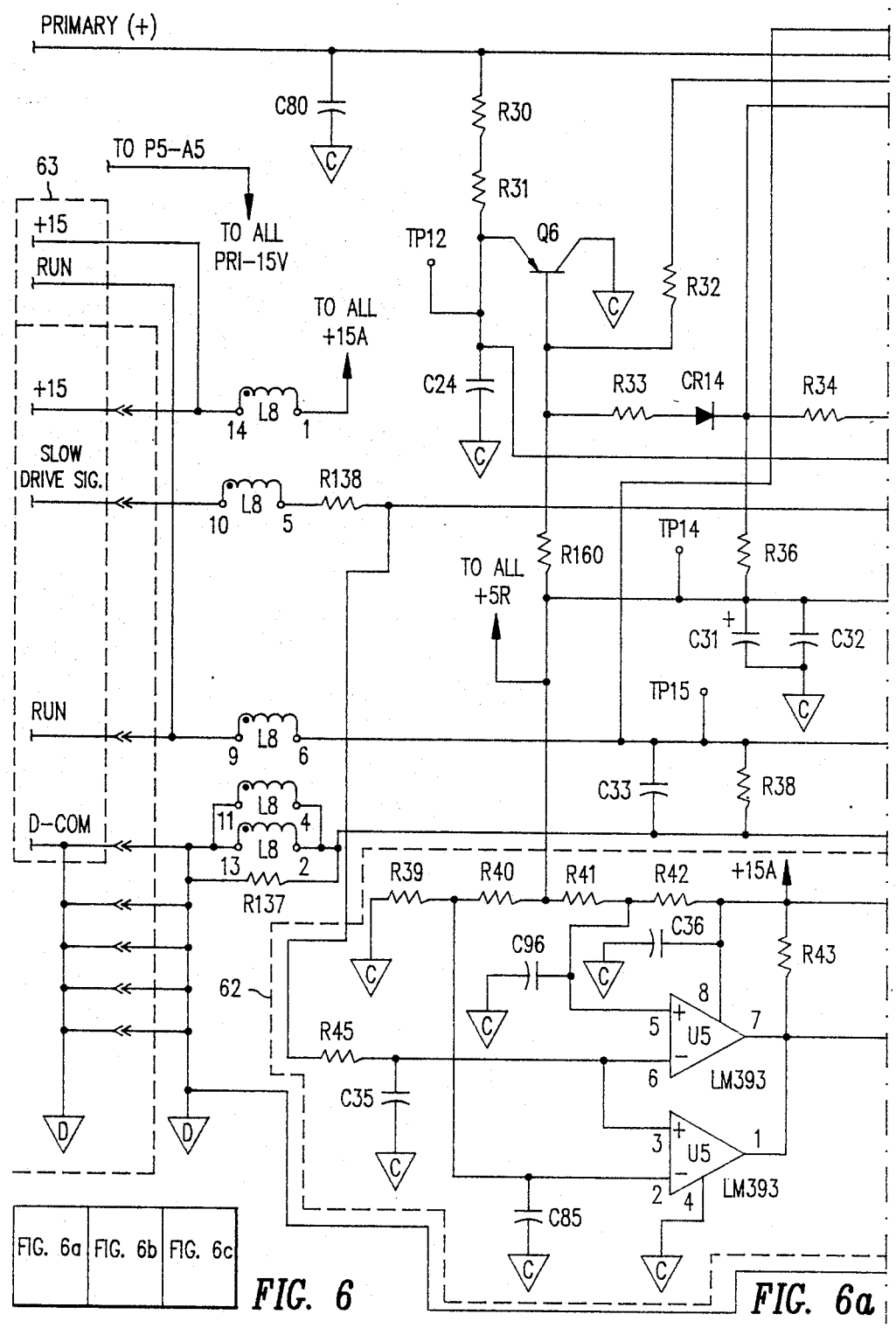
FIG. 6 shows a detailed schematic of the preferred embodiment of the present invention is a laser power supply.
Figure 6B:
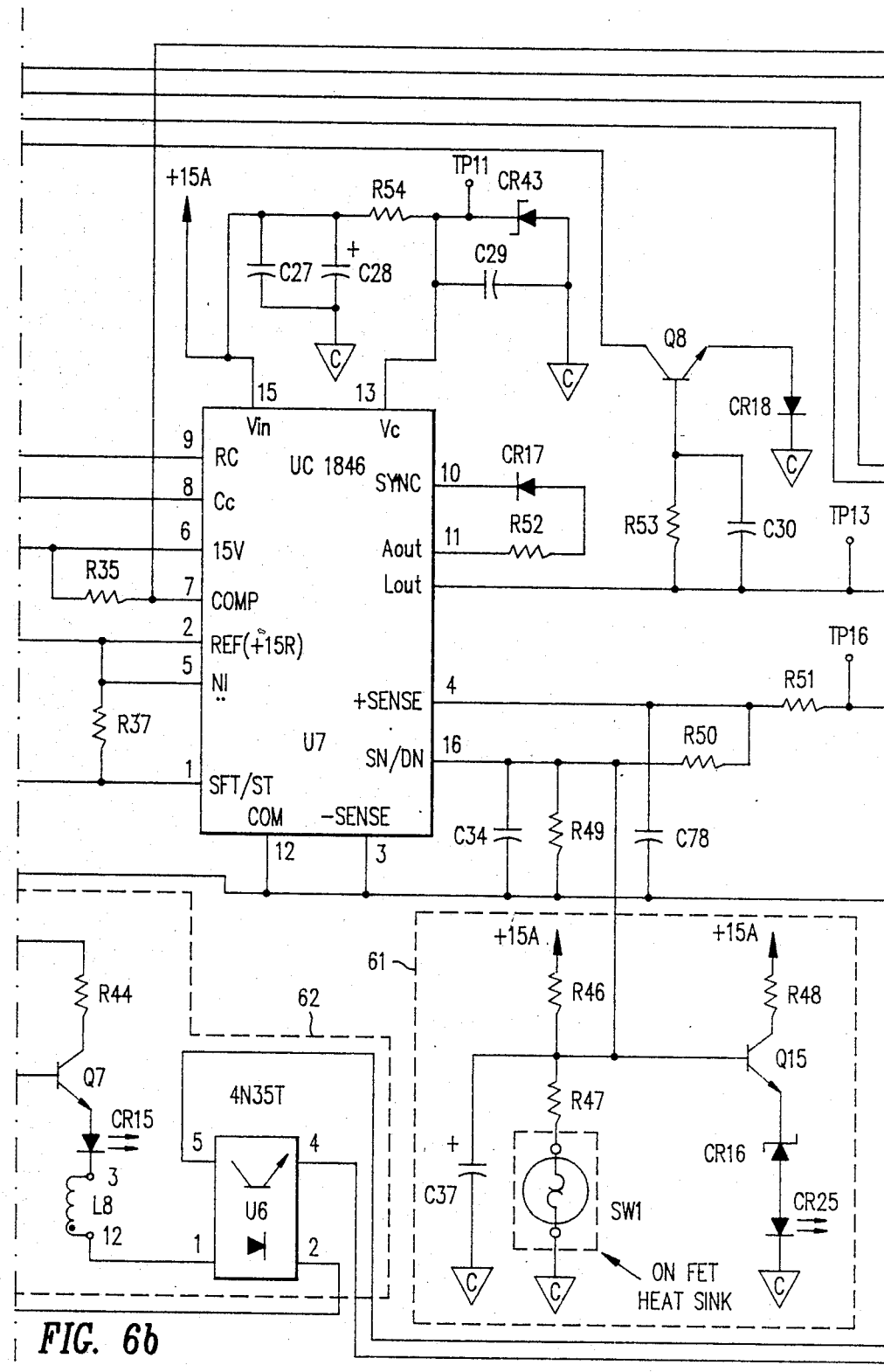
Figure 6C:
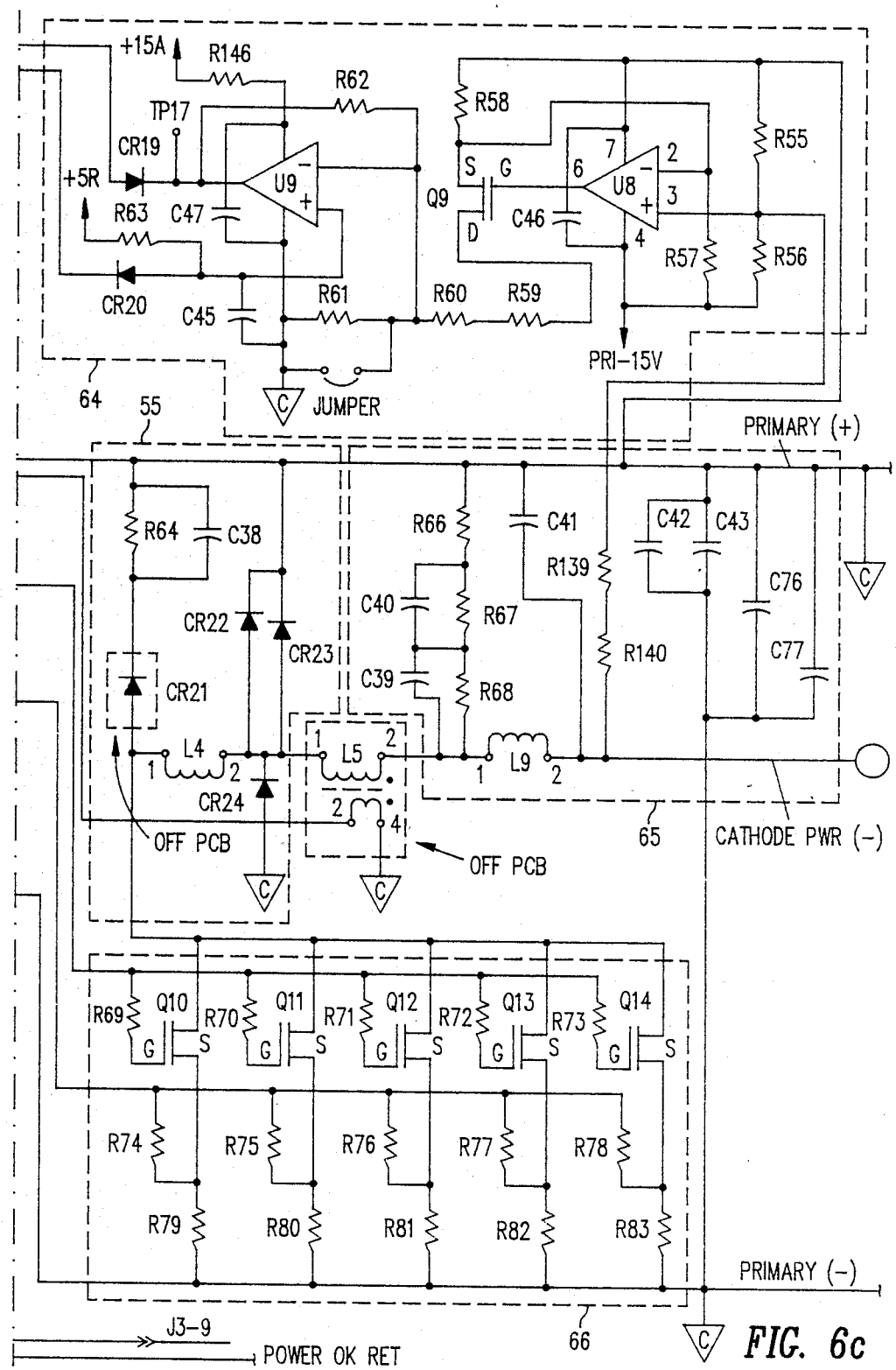

FIG. 6 shows a detailed schematic of the preferred embodiment of the present invention as used in a laser power supply. In addition to the circuit elements shown in FIG. 5, the other features shown in the schematic of FIG. 6 include the following. Conventional overtemperature shutdown circuitry 61 is connected to overcurrent shutdown pin 16 of IC 1846. Conventional window comparator 62 checks that the negative input to an operational amplifier in IC 1846 is at 5 volts. This comparator 62 provides a "power OK" signal for the load current. Inputs to the regulator are provided at input lines 63. Open circuit voltage regulator 64 limits the voltage output by the regulator when there is no load. Snubber circuit 55 is discussed above and shown here in detail. Input and output filters 64 are conventional low pass filters for the input and output voltages. Switch Q1 and resistor R7 of FIG. 5 are shown in FIG. 6 as being switch circuit 66 which includes several FET's connected in parallel, each with its associated resistors.

One alternative embodiment of the present invention uses a current (rather than voltage) ramp circuit as a timing means. A second alternative uses an inductance and resistance to determine the ramp slope, instead of a capacitor and resistance. A third alternative uses a ramp (either current or voltage) with a fixed starting point and a programmed end point. A fourth alternative embodiment uses a circuit in accordance with the present invention to regulate a boost power supply instead of a buck power supply. In this fourth embodiment, the off time is proportional to the input voltage divided by the output voltage. A fifth embodiment uses a circuit in accordance with the present invention to regulate a buck-boost power supply. In this case, the off time is proportional to the input voltage divided by the sum of the input and output voltages.

The above described embodiments of the invention are descriptive and not limiting, and other embodiments will be obvious to one of ordinary skill in the art in light of the teachings of the invention.

I claim:

1. A power supply regulator comprising:
   a common terminal;
   an input terminal for applying a direct current input;
   an output terminal;
   a catch diode having a first terminal connected to the common terminal;
   an inductor having a first terminal connected to a second terminal of the catch diode and a second terminal connected to the output terminal;
   a capacitor having a first terminal connected to the common terminal, and a second terminal connected to the output terminal;
   switch means connected between the second terminal of the catch diode and the input terminal for switching the direct current input between an on time and an off time; and means operatively connected to the switch means for varying the off time of the switch means, wherein the duration of the off time is proportional to the difference between the voltage at the input terminal and the voltage at the output terminal divided by the voltage at the input terminal.

2. The regulator of claim 1, wherein the means for varying comprises:

means for determining the starting point of a timing ramp for the off time of the switch means; and means for dtermining the slope of the off time timing ramp of the switch means;

wherein the duration of the off time of the switch means is a function of the starting point and slope of the off time timing ramp.

3. The regulator of claim 2, wherein the means for determining the slope comprises capacitor means for charging to a voltage.

4. The regulator of claim 2, wherein the means for determining the starting point comprises secondary inductor means for carrying an induced voltage.

5. The regulator of claim 4, wherein the secondary inductor means is a secondary winding on the inductor for smoothing the output voltage.

6. The regulator of claim 5, wherein the means for determining the starting point further comprises bias means for biasing an output of the inductor.

7. The regulator of claim 3, further comprising current control means connected between the means for varying and the switch means, for driving the switch means between the on time and the off time in response to the means for varying.

8. The regulator of claim 7, wherein the means for varying turns the switch means off when the current control means detects a predetermined current through the switch means.

9. The regulator of claim 8, wherein the means for determining the starting point sets the starting point of the timing ramp of the off time at a voltage differing from a threshold voltage by a value proportional to the voltage at the input terminal minus the voltage at the output terminal.

10. The regulator of claim 4, wherein the means for determining the slope comprises capacitor means for charging to a voltage; and wherein the secondary inductor means sets the voltage to which the capacitor means charges while the switch means is in the on time state.

11. A power supply regulator comprising:
a common terminal;
an input terminal for applying a direct current input;
an output terminal;
a catch diode having a first terminal connected to the common terminal;
an inductor having a first terminal connected to a second terminal of the catch diode and a second terminal connected to the output terminal;
a capacitor having a first terminal connected to the common terminal, and a second terminal connected to the output terminal;
switch means connected between the second terminal of the catch diode and the input terminal for switching the direct current input between an on time and an off time; and
means operatively connected to the switch means for varying the off time of the switch means as a function of voltages at the input and output terminals;

wherein the means for varying comprises:
means for determining the starting point of a timing ramp for the off time of the switch means;
means for determining the slope of the off time timing ramp of the switch means;
wherein the duration of the off time of the switch means is a function of the starting point and slope of the off time timing ramp; and
wherein the means for determining the starting point comprises secondary inductor means for carrying an induced voltage.

12. A power supply regulator comprising:
a common terminal;
an input terminal for applying a direct current input;
an output terminal;
a catch diode having a first terminal connected to the common terminal;
an inductor having a first terminal connected to a second terminal of the catch diode and a second terminal connected to the output terminal;
a capacitor having a first terminal connected to the common terminal, and a second terminal connected to the output terminal;
switch means connected between the second terminal of the catch diode and the input terminal for switching the direct current input between an on time and an off time; and
means operatively connected to the switch means for varying the off time of the switch means as a function of voltages of the input and output terminals;
wherein the means for varying comprises:
means for determining the starting point of a timing ramp for the off time of the switch means; and
means for determining the slope of the off time timing ramp of the switch means;
wherein the duration of the off time of the switch means is a function of the starting point and slope of the off time timing ramp, and
wherein the means for determining the slope comprises capacitor means for charging to a voltage; and
further comprising current control means connected between the means for varying and the switch means, for driving the switch means between the on time and the off time in response to the means for varying.

13. A method of operating a current mode switching regulator which includes:
a common terminal;
an input terminal;
an output terminal;
a catch diode having a first terminal connected to the common terminal;
an inductor having a first terminal connected to a second terminal of the catch diode and a second terminal connected to the output terminal;
a capacitor having a first terminal connected to the common terminal, and a second terminal connected to the output terminal; and
a switch connected between the second terminal of the catch diode and the input terminal;
the method comprising the steps of:
switching the switch between an on time and an off time; and
varying the off time of the switch, wherein the duration of the off time is proportional to the difference between the voltage at the input terminal and the voltage at the output terminal divided by the voltage at the input terminal.

* * * * *